(12) United States Patent
Schauberger et al.

(10) Patent No.: US 12,164,461 B2
(45) Date of Patent: Dec. 10, 2024

(54) VIRTUALIZED COMPUTER SYSTEM FOR VERIFICATION, TESTING, ASSESMENT AND, MITIGATION

(71) Applicant: Altum Trading Company, LLC

(72) Inventors: Ed Schauberger, Edmond, OK (US); Frank Nickel, Edmond, OK (US); Johnathon T. Bailey, Edmond, OK (US); Curtis Scott, Edmond, OK (US)

(73) Assignee: Altum Trading Company, LLC, Edmond, OK (US)

( * ) Notice: Subject to any disclaimer, the term of this patent is extended or adjusted under 35 U.S.C. 154(b) by 124 days.

(21) Appl. No.: 16/778,412

(22) Filed: Jan. 31, 2020

(65) Prior Publication Data

US 2020/0250130 A1 Aug. 6, 2020

Related U.S. Application Data

(60) Provisional application No. 62/799,573, filed on Jan. 31, 2019.

(51) Int. Cl.
*G06F 15/173* (2006.01)
*G06F 8/71* (2018.01)
*G06F 9/455* (2018.01)

(52) U.S. Cl.
CPC .......... *G06F 15/17337* (2013.01); *G06F 8/71* (2013.01); *G06F 9/45558* (2013.01)

(58) Field of Classification Search
CPC .................... G06F 2009/45587; G06F 9/45558
See application file for complete search history.

(56) References Cited

U.S. PATENT DOCUMENTS

| | | | | |
|---|---|---|---|---|
| 9,916,233 | B1* | 3/2018 | Qureshi | G06F 11/3688 |
| 10,360,408 | B1* | 7/2019 | Kincaid | G06F 21/57 |
| 2008/0271019 | A1* | 10/2008 | Stratton | G06F 21/577 |
| | | | | 718/1 |
| 2017/0235951 | A1* | 8/2017 | Harrison | G06F 21/568 |
| | | | | 726/24 |
| 2017/0286281 | A1* | 10/2017 | Dahan | G06F 11/3608 |
| 2018/0113728 | A1* | 4/2018 | Musani | G06F 11/362 |

OTHER PUBLICATIONS

"Oracle VM Virtual Box: User Manual", Version 5.2.22, 2004-2018, Oracle Corporation, 384 pgs.

* cited by examiner

*Primary Examiner* — Jason D Mitchell
*Assistant Examiner* — Mark A Gooray
(74) *Attorney, Agent, or Firm* — DUNLAP CODDING, P.C.

(57) ABSTRACT

An apparatus and method is provided for simulating a physical computer system using virtualization. The disclosed system virtualizes devices of a physical computer system by modeling hardware and software components that are physically present within the physical computer system. The system simulates changing at least one of a piece of hardware or software in the virtualized computer system and assesses an effect of the change in the virtualized computer system to determine a potential effect of the change if the change were implemented on the physical computer system.

6 Claims, 7 Drawing Sheets

| OSMT | VRSTL |
|---|---|
| Cybersecurity Server | Cybersecurity Server |
| Cybersecurity Switch | Cybersecurity Switch |
| VLAN Printer | VLAN Printer |
| Network Switch w/VLANS | Network Switch w/VLANS |
| Scanned Devices | Scanned Devices |
| PIT Appliances | PIT Appliances |
| Cybersecurity Domain Controller | Cybersecurity Domain Controller |

FIG. 6

VIRTUALIZED COMPUTER SYSTEM FOR VERIFICATION, TESTING, ASSESMENT AND, MITIGATION

INCORPORATION BY REFERENCE

The present patent application claims priority to a provisional patent application identified by U.S. Provisional Application No. 62/799,573 filed Jan. 31, 2019, the disclosure of which is hereby incorporated by reference in its entirety.

GOVERNMENT LICENSE RIGHTS

Not applicable.

BACKGROUND

Virtualization is a continually growing field in the computer technology industry and has been utilized for various purposes including rapid recovery from system crashes, errors, as well as sandboxing or isolating virtual systems for purposes of security or stability. These current applications of virtualization are useful, beneficial, and convenient, but do not incorporate the application and usage of virtualization for the simulation of physical computer systems for testbed, threat scenario assessment or mitigation, as well as rapid deployment of modifications, patches, redesigns, and upgrades.

Therefore, a need exists in the field of virtualization for a system that can be used to perform testbed simulation, threat scenario assessment and/or mitigation, as well as rapid deployment of modifications, patches, redesigns, and upgrades

SUMMARY

The present disclosure describes a novel system including at least one virtualized computer system that has software and hardware installed capable of virtualizing all elements of a physical computer system. The virtualized computer system is described below by way of example as a virtual remote scan testing lab. The physical computer system can be any computer system that hosts specific hardware and software computing processes that can be analyzed. The physical computer system is described by way of example below as an offensive station mission trainer. These elements can be representations of physical entities such as computer systems, operating systems, custom devices and/or systems, as well as anything that is physically present and functioning in the actual computer system. In preferred embodiments, the various elements of the virtualized computer system represent actual components present in military weapons systems trainers. These elements which represent the actual weapon systems trainers components, systems, and subsystems are integrated into a virtual representation of the physical computer system in order to perform tests, analysis, vulnerability assessments, scans, and deployment of mitigations for solution or resolution of problems that can and will be encountered on the physical computer system. For instance, the physical computer system may be a flight simulator or trainer which simulates the flight of a current military aircraft.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 6 illustrates a list of system components of an offensive mission trainer and a virtual remote scan testing laboratory in accordance with the presently disclosed inventive concepts;

DETAILED DESCRIPTION

Figure 1:
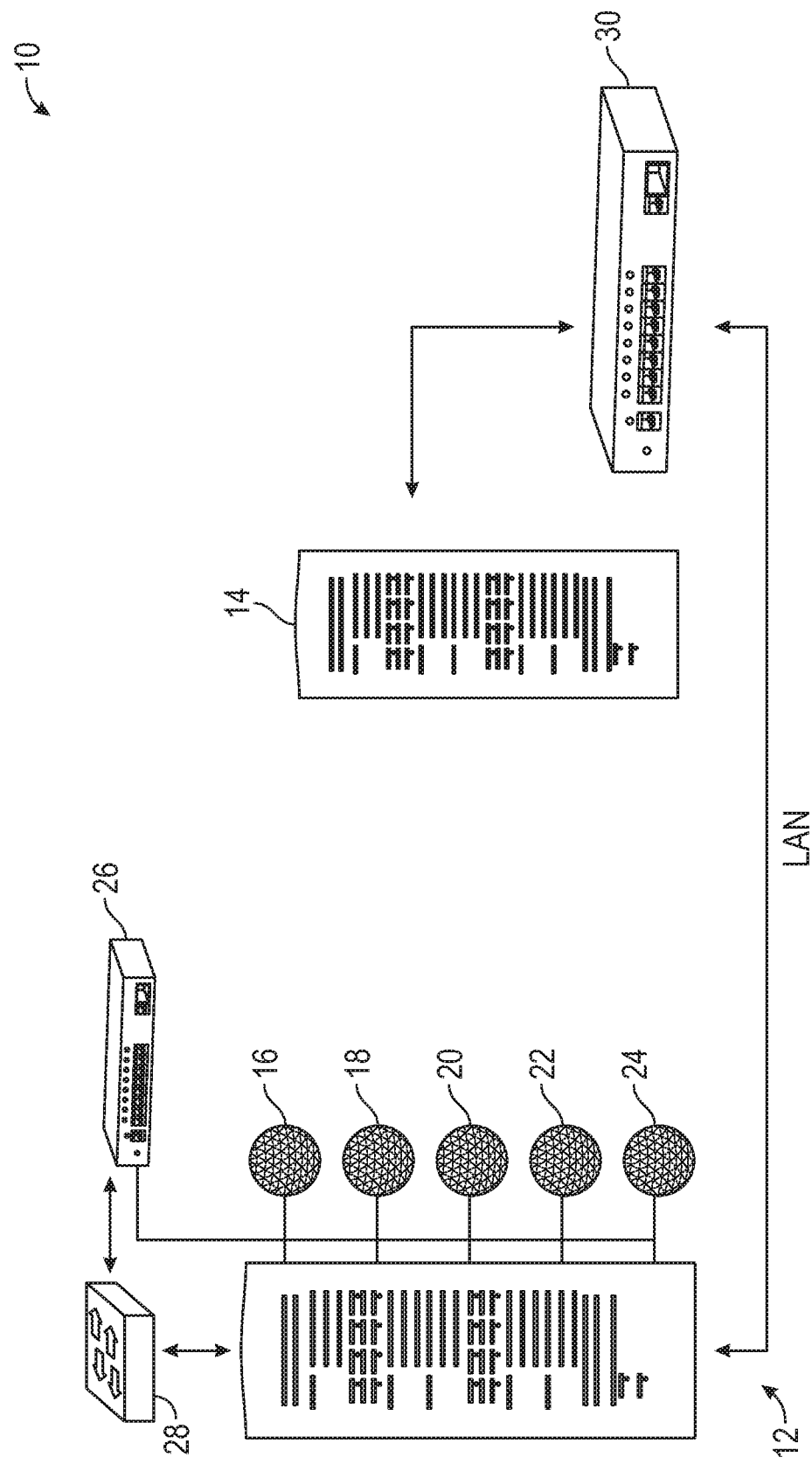
FIG. 1 illustrates an exemplary virtual remote scan testing laboratory according to one embodiment of the presently disclosed inventive concepts.

The following detailed description refers to the accompanying drawings. The same reference numbers in different drawings may identify the same or similar elements.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Further, the phrase "based on" is intended to mean "based, at least in part, on" unless explicitly stated otherwise.

Also, certain portions of the implementations have been described as "components" or "circuitry" that perform one or more functions. The term "component" or "circuitry" may include hardware, such as a processor, an application specific integrated circuit (ASIC), or a field programmable gate array (FPGA), or a combination of hardware and software.

Software includes one or more computer executable instructions that when executed by one or more component cause the component or circuitry to perform a specified function. It should be understood that the algorithms described herein are stored on one or more non-transitory memory. Exemplary non-transitory memory includes random access memory, read only memory, flash memory or the like. Such non-transitory memory can be electrically based or optically based. Further, the messages described herein may be generated by the components and result in various physical transformations.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The inventive concepts disclosed and described herein were developed for remote scanning of offensive station mission trainers used by the United States Air Force to train personnel in the use of aircraft such as the B-52. These offensive station mission trainers are housed in a Sensitive Compartmented Information Facility (SCIF) which is an enclosed area within a building that is used to house or store Sensitive Compartmented Information (SCI) types of classified information or systems. The offensive station mission trainers are not connected to any systems outside the SCIF such as the internet. Therefore, any testing or upgrades need to be done physically in the SCIF which requires the offensive station mission trainer to be offline or unusable during servicing. These downtimes lead to lost revenues for the companies that provide the offensive station mission trainers (which are contracted based on uptime and/or availability) as well as lost training time for personnel.

The apparatus and methods described herein may be used in a two-phase design verification testing approach. This approach permits assured compliance assessment solutions network vulnerability, configuration assessment, and network discovery scans of a virtualized computer system that mimics all elements that are physically present and functioning within the offensive station mission trainer to be performed by a cyber security server replica before any actual changes are made to the physical offensive station mission trainer. This minimizes downtime as any threats or software and/or hardware conflicts are identified and fixed prior to installation on a physical offensive station mission trainer. Further, the inventive concepts described herein permit software development and testing to occur without physical access to the highly sensitive and expensive computer systems.

In one embodiment illustrated in FIG. 1, a virtual remote-scan testing lab 10 is provided with a virtual offensive station mission trainer 12 and a cyber security server replica 14.

The virtual remote-scan testing lab 10 allows the virtual offensive station mission trainer 12 to be scanned by the cyber security server replica 14. Each scannable component that is physically present and functioning of a physical offensive station mission trainer 50 (FIG. 2) is virtualized and represented as an individual part of the virtual offensive station mission trainer 12. For instance, the virtual offensive station mission trainer 12 illustrated in FIG. 1 is provided with a virtual audio PC 16, a virtual targeting pod PC 18, a virtual IOS PC 20, a virtual RSS PC 22, a virtual offensive station mission trainer host PC 24, a virtual switch 26, and a virtual trunk port 28. As will be described in more detail with regard to FIG. 4 below, each of the virtualized machines 16, 18, 20, 22, and 24 includes hardware and software profiles that match the associated physical computer systems such that scanning and/or making changes to the virtual systems will produce the same results as scanning and/or making changes to the physical computer system.

As illustrated in FIG. 1, the virtual remote scan testing lab 10 is provided with a cyber security switch 30 which connects the virtual offensive station mission trainer 12 to the cyber security server replica 14.

Figure 2:
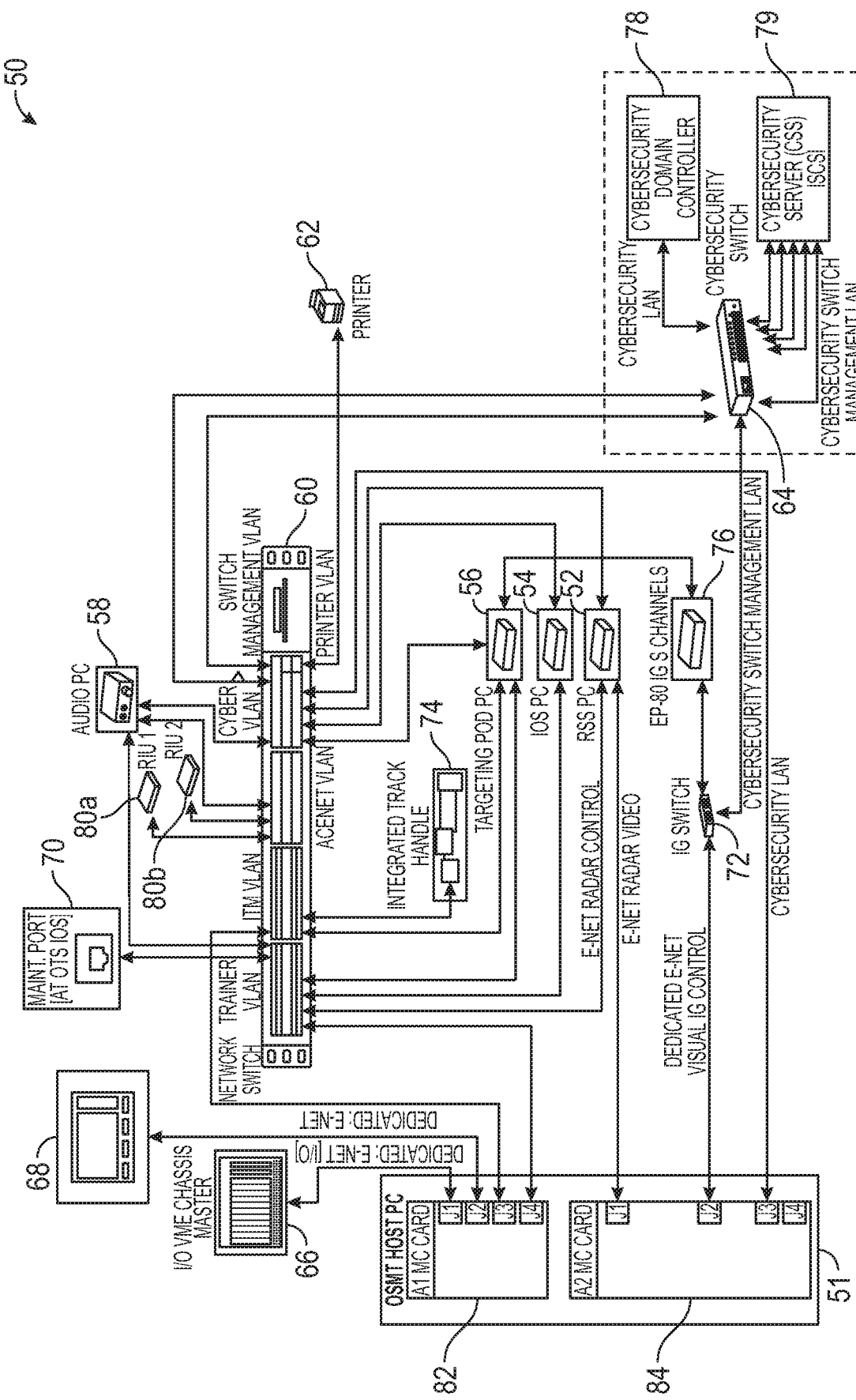
FIG. 2 illustrates an exemplary offensive station mission trainer according to one embodiment of the presently disclosed inventive concepts.

As shown in FIG. 2, components of one embodiment of the offensive station mission trainer 50 may include an offensive station mission trainer host PC 51, an RSS PC 52, an IOS PC 54, a targeting pod PC 56, an audio PC 58, a network switch 60, a printer 62, a cyber security switch 64, a chassis master 66, an avionics functional equivalent unit 68, a maintenance port 70, an IG switch 72, an integrated track handle 74, a five channel IG 76, a cyber security domain controller 78, a cyber security server 79, and remote interface units 80a and 80b.

As illustrated in FIG. 2, various elements of the offensive station mission trainer 50 may be connected to the network switch 60 and/or the offensive station mission trainer host PC 51 via a first network interface card 82 and a second network interface card 84. The ability to interconnect allows the offensive station mission trainer 50 to be modular and allows the connection or disconnection of various components as needed.

The virtual offensive station mission trainer 12 of the virtual remote-scan testing lab 10 is a simulation of the offensive station mission trainer 50 in a post-tech refresh state. In other words, the virtual offensive station mission trainer 12 simulates the offensive station mission trainer 50 after a change, such as a hardware or software upgrade. For instance, before a change, such as updating a driver, in the offensive station mission trainer 50, a test may be performed on the virtual offensive station mission trainer 12 wherein the driver is installed on the virtual offensive station mission trainer 12 to determine if there is a possible conflict with existing hardware or software in the offensive station mission trainer 50. Further, the virtual offensive station mission trainer 12 may be used to simulate various vulnerabilities and potential threat scenarios, also referred to as common vulnerabilities and exposures. Examples of these include, but are not limited to, open ports and services, TCP/MAC spoofing, SYN flooding, session hijacking, man-in-the-middle attacks, and DNS protocol attacks. As new methods of intrusion and vulnerabilities are developed and discovered, they can be rapidly stimulated and addressed in the virtual remote-scan testing lab 10.

Figure 3:
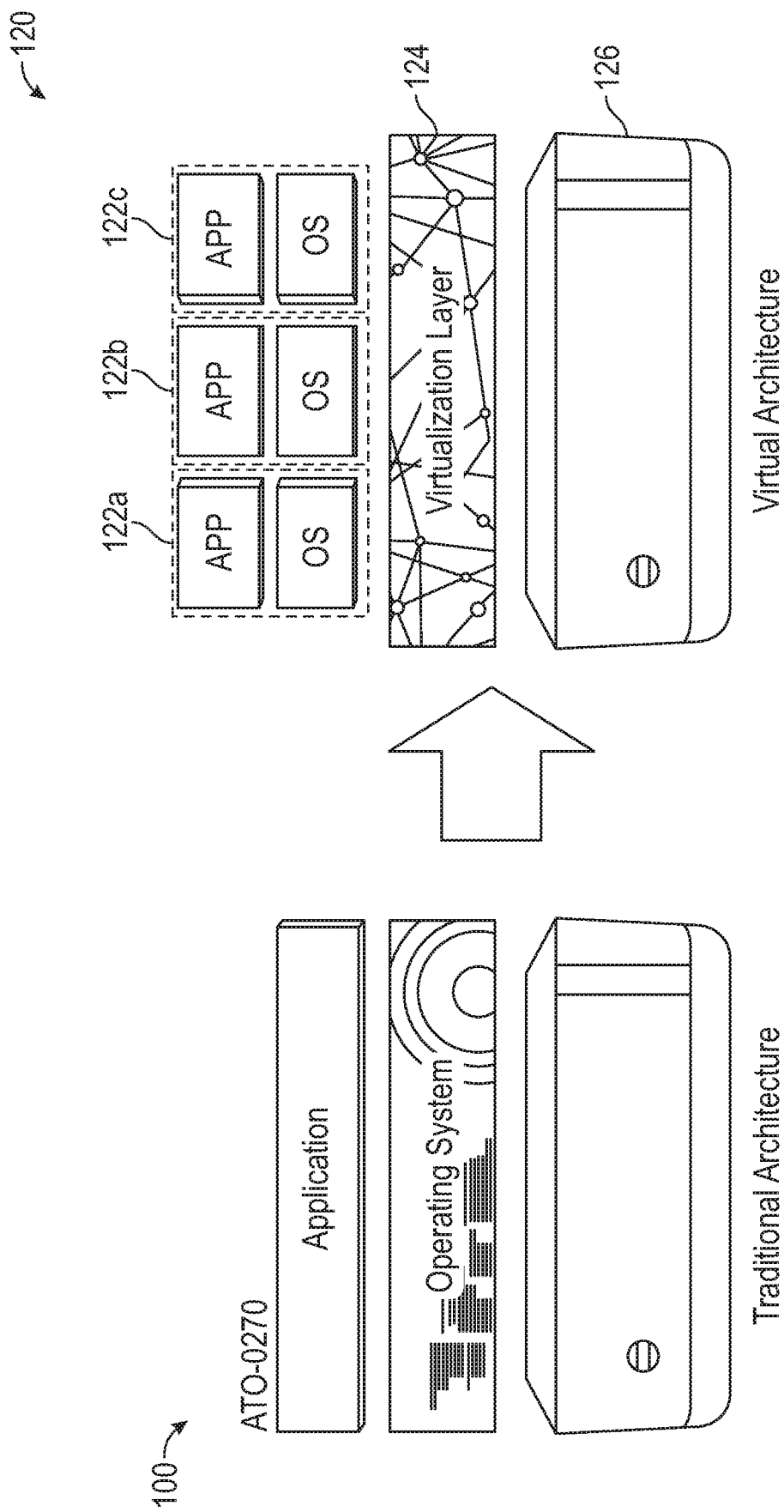
FIG. 3 illustrates a conventional system not using virtualization and an exemplary virtualized computer system in accordance with the presently disclosed inventive concepts.

System virtualization is typically hypervisor-based. Operating systems and applications are isolated and/or virtually separated from the underlying computer hardware by a hypervisor. This allows the host machine to run multiple virtual machines. As shown in FIG. 3, the hypervisor is a virtualization layer 124 that can either be hardware-based or software-based. FIG. 3 illustrates a traditional architecture 100 and a virtualized architecture 120. In the virtualized architecture 120, there can be multiple virtual machines 122a, 122b, and 122c running on one hardware system 126 depending on system capability and available memory. Virtual machines 122a, 122b, and 122c share the hardware systems 126 physical resources such as memory, network bandwidth, and processor cycles. Separate applications running on each virtual machine 122a, 122b, and 122c can also respond to network traffic and simulate a system response to a remote scan request. Type I hypervisors (also known as bare-metal hypervisors), run directly on top of the host system hardware. Type I hypervisors offer increase performance and availability, as well as detailed resource management. Their direct access to the system's core hardware allows better scalability, performance, and stability. Examples of type I hypervisors include Microsoft Hyper-V, Citrix XenServer, and VMware ESXi (vSphere).

A type 2 hypervisor, also known as a hosted hypervisor, is installed on top of the host operating system rather than running directly on top of the hardware as the type 1 hypervisor does. Each guest operating system or virtual machine runs above the type 2 hypervisor. The convenience of a known host operating system can ease system configuration and management tasks; however, the addition of a host operating system layer can potentially limit performance and expose possible operating system security flaws. Examples of type 2 hypervisors include VMware Workstation, Virtual PC, and Oracle VM VirtualBox. It should be noted that the inventive concepts disclosed herein may be run on either a type 1 hypervisor or a type 2 hypervisor.

In one embodiment, the virtual remote scan testing lab 10 virtualizes each offensive station mission trainer 50 node in the virtual offensive station mission trainer 12 (e.g., virtual offensive station mission trainer host PC 51, RSS PC 52, audio PC 58, IOS PC 54, and targeting pod PC 56, for example). In such an embodiment, it is necessary to virtualize all appropriate offensive station mission trainer 50 post-refresh hardware in the virtual remote scan testing lab 10. Both the offensive station mission trainer 50 and the cyber security server 79 use a trusted platform module on each node. Trusted platform modules are secure crypto processors that enhance host security by providing a trust assurance rooted in hardware as opposed to software. The trusted platform module is used to securely store artifacts to authenticate each platform that the artifact(s) is installed upon. An artifact can include a password, certificate, or an encryption key. Because all offensive station mission trainer 50 nodes will be virtualized in the virtual offensive system mission trainer 12, the trusted platform module also requires virtualization using virtual trusted platform modules. A virtual trusted platform module does not require a physical trusted platform module to be present on the virtual offensive station mission trainer 12, however, if host attestation is necessary a physical trusted platform module is required.

In one embodiment, the offensive station mission trainer 50 includes a Dell PowerEdge R440 server running a type 1 vSphere hypervisor that is configured to run multiple Windows 10 64-bit virtual machines (VMs) representing each of the virtual offensive station mission trainer 12 components shown in FIG. 1. This server, in the preferred embodiment, will virtualize all offensive station mission trainer 50 refresh system components that will be scanned in the offensive station mission trainer 50 refresh system. In addition to these physical devices being virtualized, the offensive station mission trainer 50 network switch management VLAN will also be virtualized. This includes the trainer, ITH, ACENet, and cyber VLANs. One external, physical, 16-port, 1 GB, network switch (cybersecurity switch 30) will allow the cyber security server replica 14 to be connected in the same configuration as in the offensive station mission trainer 50 refresh system. The cyber security server replica 14, in one embodiment, will include a Dell PowerEdge R230 server running Windows 10 x64 Server 2016. The entire system of the preferred embodiment will be mounted in a half-height rack with a UPS and NAS backup system. FIG. 6 shows exemplary hardware that will be virtualized in the virtual remote scan testing lab 10 versus the hardware in the post-refresh state.

Multiple VMs running a Windows 10 OS (as used in the offensive station mission trainer 50 refresh system), for example, will be configured for the preferred embodiment of the invention. Each VM will respond to TCP/IP traffic and will have unique MAC and IPV4 addresses representative of the offensive station mission trainer 50 post-refresh system. When an incoming ACAS scan request is received, each VM will respond accordingly. Each VM can be configured as necessary to have open (or closed) ports and services as necessary to simulate the offensive station mission trainer 50 post-refresh system. The response will provide the cyber security server replica 14 scan application with information representative of ACAS scans. The content of the scans will be characteristic of offensive station mission trainer 50 system scan responses complete with IP, MAC, and CVE vulnerabilities.

Figure 5:
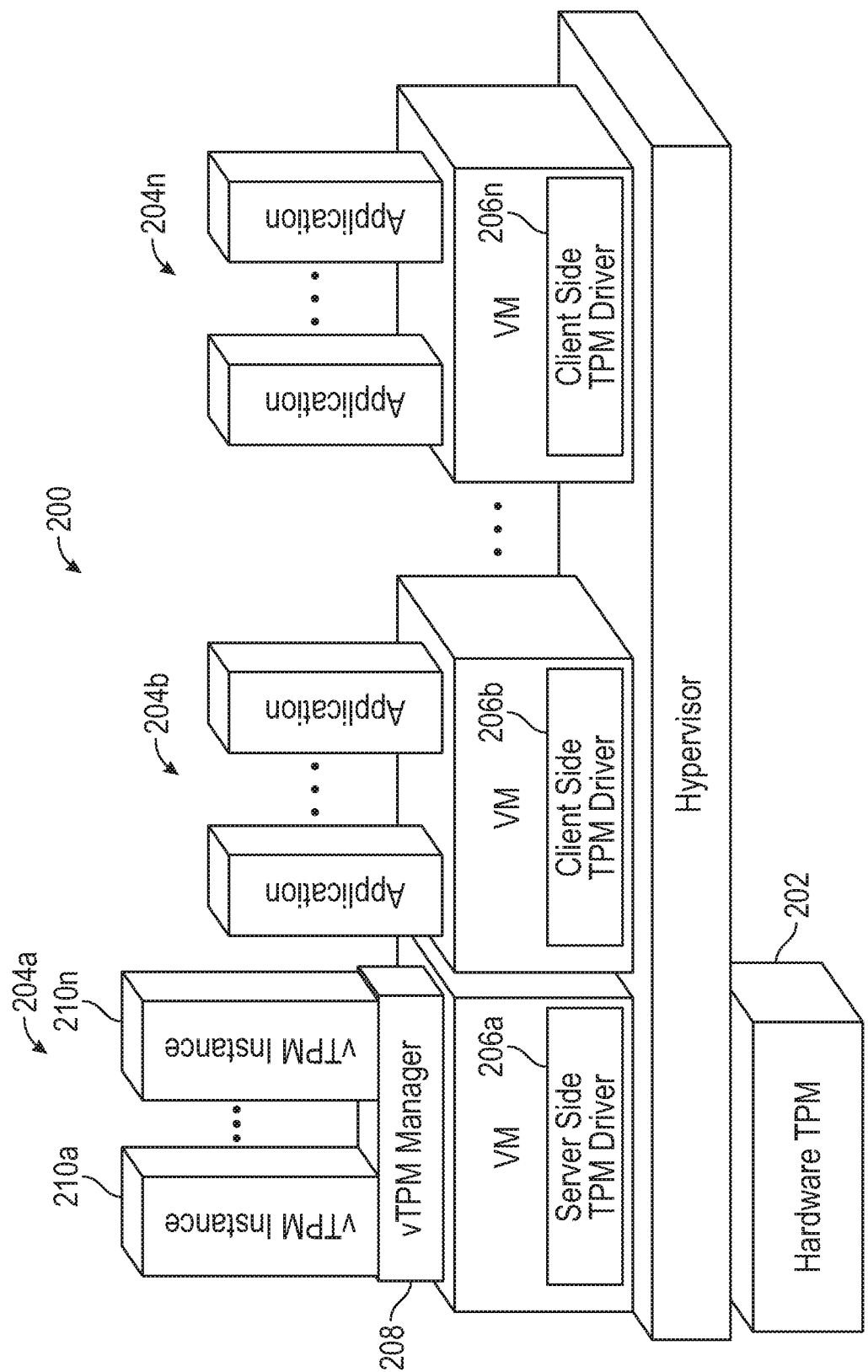
FIG. 5 illustrates an exemplary virtual offensive station mission trainer of a virtual remote scan testing laboratory having a hardware trusted platform module in accordance with the presently disclosed inventive concepts.

As illustrated in FIG. 5, a virtual offensive station mission trainer 200 may be provided with a physical trusted platform module chip 202 which allows host attestation. In such an embodiment, the virtual offensive station mission trainer 200 is provided with a number of virtual machines 204a, 204b, and 204n. Virtual machines 204a, 204b, and 204n are provided with TPM drivers 206a, 206b, and 206n. In the embodiment illustrated in FIG. 5, virtual machine 204a is a server and includes a virtual trusted platform module manager 208 which manages virtual trusted platform modules 210a-210n.

Figure 4:
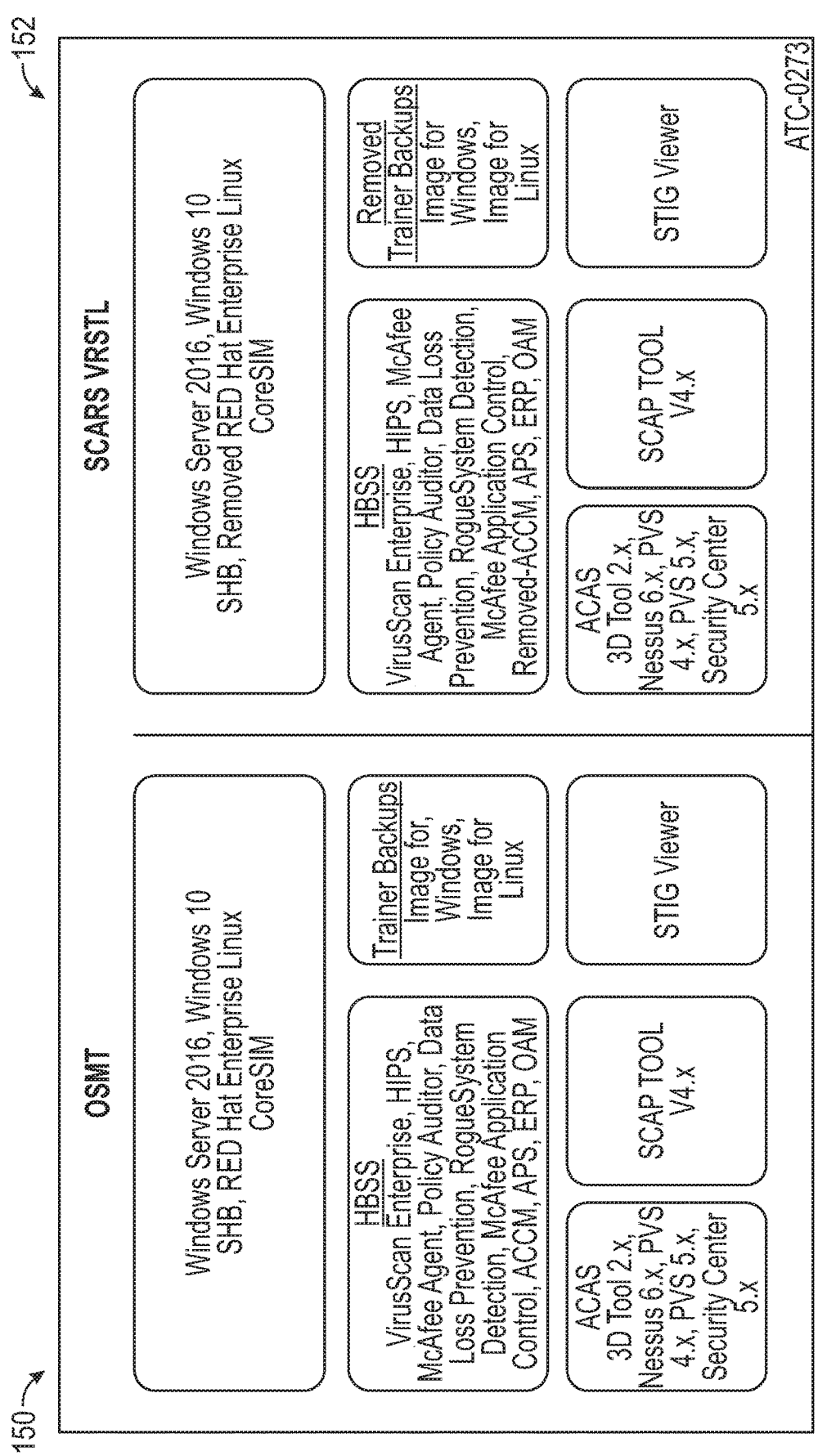
FIG. 4 illustrates software suites in an exemplary physical offensive station mission trainer and an exemplary virtual remote scan testing laboratory in accordance with the presently disclosed inventive concepts.

Referring now to FIG. 4, a list of software loaded on an offensive station mission trainer 150 and one embodiment of a virtual remote-scan testing lab 152 are illustrated. As illustrated in FIG. 4, the virtual remote-scan testing lab 152 includes all of the software necessary to virtualize all hardware and software systems scanned in a refresh of the offensive station mission trainer 150. For instance, in the illustrated embodiments, the trainer backups, RED Hat Enterprise Linux CoreSIM, ACCM, APS, ERP, and OAM programs are not scanned in a refreshed offensive station mission trainer 150, therefore, the systems are not necessary in the virtual remote-scan testing lab 152.

To determine what hardware and software programs will be virtualized, the virtual remote-scan testing lab 152 may use predetermined rules. An exemplary set of rules determines whether particular hardware or software components are:
1) present and functioning;
2) scannable, present, and functioning;
3) present but not functioning;
4) items to be added; and
5) determined to be present and necessary for the purposes of the changes to be evaluated.

Various configurations of these predetermined rules could be used to determine which hardware and software programs will be virtualized in a given system.

In general, a particular hardware or software component may be determined to be unnecessary if the particular hardware or software component would affect the results of the action(s) performed and subsequent analysis on the virtualized system in a way that would not represent the actual system's elements/behavior that are being represented by the virtualized system. For instance, on a smartphone you may have many applications. If your phone is virtualized (or emulated) and you want to perform a particular action on that virtualized phone and that action involves any of the app's that are on your phone, then those apps would need to be virtualized and included in the simulation. In this case, the apps that would affect a particular action on the physical phone are considered present and necessary for the virtualized system. All other software apps would be considered unnecessary, and would not need to be included because they would not affect the results of the tests or actions that you would perform in the virtualized system.

In some instances, hardware and software that needs to be virtualized may be determined based on organizational requirements. These organizational requirements may stem from whatever publication, documentation, or risk management processes a customer is utilizing, for instance. Some are more stringent than others, and therefore that information can only be established through an assessment of the organizational requirements.

It should be noted that some components may be determined to be unnecessary (and not virtualized) because of other restrictions due to security, etc. For example, some classified systems may be capable of virtualization but are determined to be unnecessary due to their sensitive nature. Further, some components cannot be virtualized due to virtualization restraints that do not allow hardware or software components to function properly in a virtual environment.

It should be noted, however, that in some embodiments of the virtual remote-scan testing lab 152, all of the software and hardware that is physically present in the offensive station mission trainer 150 may be virtually and/or physically present in the virtual remote-scan testing lab 152.

Referring now to FIG. 6, an overview of exemplary systems of an offensive station mission trainer 250 and a virtual remote-scan testing lab 252 are listed. All of the offensive station mission trainer 250 systems are physical computer systems present in the SCIF described above. To facilitate remote scanning of a virtualized computer system representing the offensive station mission trainer 250, certain parts of the offensive station mission trainer 150 are matched physically in the virtual remote-scan testing lab 252 (a cybersecurity server 254, a cybersecurity switch 256, and a VLAN printer 258) while some systems are virtualized (network switch w/VLANS 260 and scanned devices 262) and certain devices (PIT appliances 264 and cybersecurity domain controller 266) may not be included in the virtual remote-scan testing lab 252 because they are not scanned in the real-world version of the offensive station mission trainer 250. These systems are not scanned, for instance, due to the sensitive nature of the system and the possibility of degraded performance, or due to the fact that the system does not contain any components that require scanning.

Figure 7:
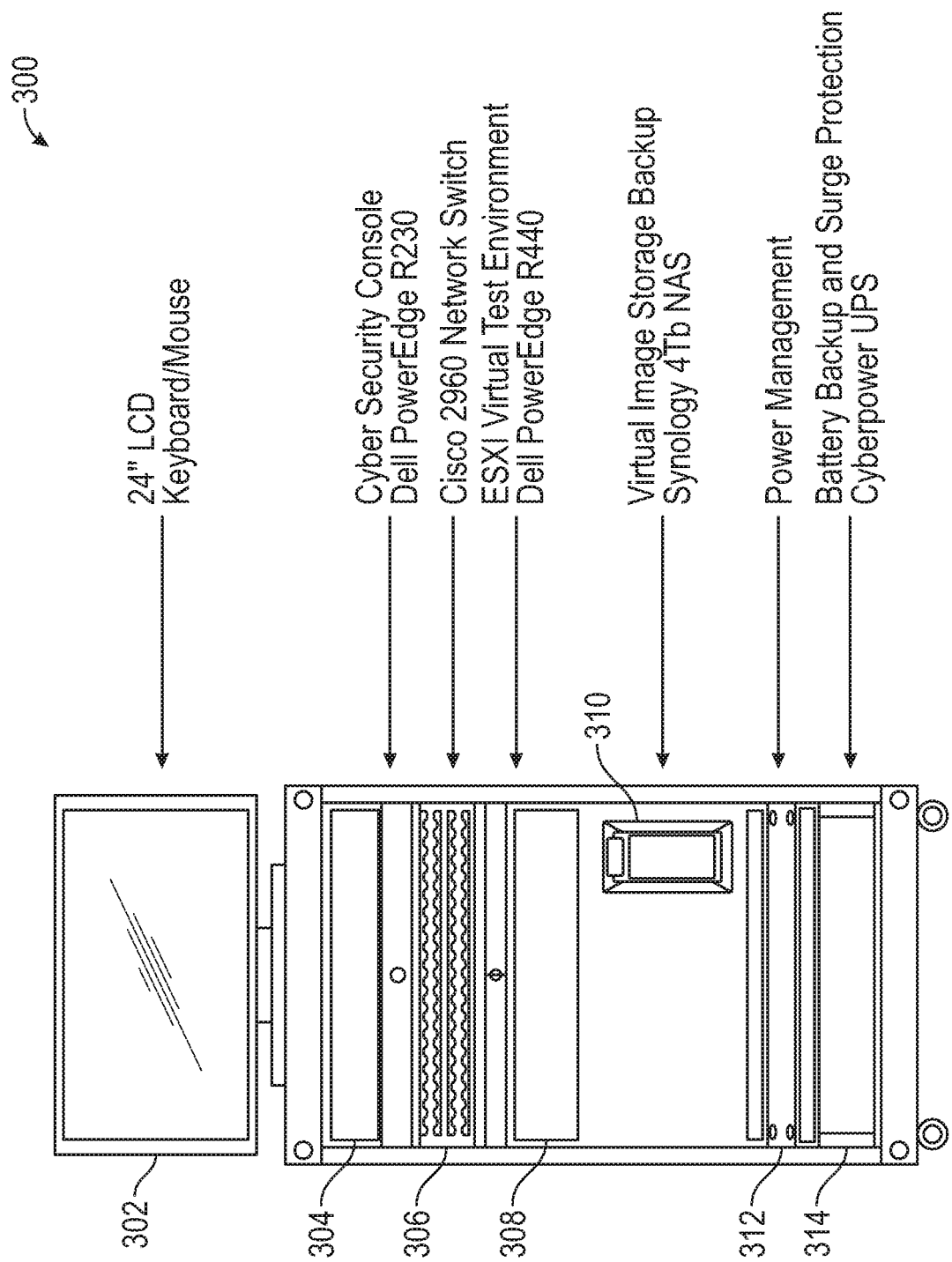
FIG. 7 illustrates the physical components of a virtual scan testing laboratory in accordance with the presently disclosed inventive concepts.

Referring now to FIG. 7, a virtual remote-scan testing lab 300 is illustrated having an input/output device 302, a cyber security console 304, a network switch 306, a virtual offensive station mission trainer 308, a virtual image storage backup 310, a power management strip 312, and a battery backup 314.

Implementations of the input/output device 302 may include, but are not limited to, implementation as a keyboard, touchscreen, mouse, trackball, microphone, fingerprint reader, infrared port, slide-out keyboard, flip-out keyboard, combinations thereof, and/or the like, for example. It is to be understood that in some exemplary embodiments, the input/output device 302 may be implemented as a single device, such as, for example, a touchscreen of a computer, or a tablet. It is to be further understood that as used herein the term user is not limited to a human being, and may comprise, a computer, a server, a website, a processor, a network interface, a human, a user terminal, a virtual computer, combinations thereof, and/or the like, for example.

The cyber security console 304 may be a computer capable of interfacing and/or communicating with the virtual offensive station mission trainer 308 via the network switch 306. For example, the cyber security console 304 may be configured to interface by exchanging signals (e.g., analog, digital, optical, and/or the like) via one or more ports (e.g., physical ports or virtual ports) using a network protocol, for example. Additionally, the cyber security console 304 may be configured to communicate with the virtual image storage backup 310 by exchanging signals (e.g., analog, digital, optical, and/or the like) via one or more ports (e.g., physical ports or virtual ports) using a network protocol, for example.

In some embodiments, the cyber security console 304 and the virtual image storage backup 310 may comprise one or more processors working together, or independently to, execute processor executable code stored on memory. Each element of the cyber security console 304 and the virtual image storage backup 310 may be partially or completely network-based or cloud-based, and may or may not be located in a single physical location.

The processors of the cyber security console 304 and the virtual image storage backup 310 may be implemented as a single processors or multiple processors working together, or independently, to execute the program logic that performs the functions described herein. It is to be understood, that in certain embodiments using more than one processor, the processors may be located remotely from one another, located in the same location, or comprising a unitary multi-core processor. The processors may be capable of reading and/or executing processor executable code and/or capable of creating, manipulating, retrieving, altering, and/or storing data structures into the memory.

Exemplary embodiments of the processors may be include, but are not limited to, a digital signal processor (DSP), a central processing unit (CPU), a field programmable gate array (FPGA), a microprocessor, a multi-core processor, combinations, thereof, and/or the like, for example. The processors may be capable of communicating with the memory via a path (e.g., data bus). The processors may be capable of communicating with the input/output device 302.

In one embodiment, the software requirements for the virtual remote-scan testing lab 10 shown in FIG. 1 will consist of the operating systems (OSs) and applications necessary for the virtual offensive station mission trainer 12 and additionally for the cyber security server replica 14. The virtual remote-scan testing lab 10 elements that are required to make up both the virtual offensive station mission trainer 12 OS software as well as the HBSS (see FIG. 4) and ACAS software (see FIG. 4) that runs on the cyber security server replica 14 will be acquired, installed, and configured to represent the post refresh architecture. In the preferred embodiment of the virtual remote scan testing lab 10, an OS will be required for each virtual machine that represents and simulates each computer on the physical OSMT, post refresh. There are five Windows SHB x64 PCs and one Windows Server SHB x64. Since none of the PIT appliances will be virtualized, there is no software or virtualization required.

To virtualize each of the OSs in this embodiment an ESXi (vSphere) type 1 hypervisor will be required as described above. This hypervisor will run directly on the R440 Dell server, which will allow for complete control of all virtualized LAN TCP/IP, UDP traffic, as well as full control and customization of all system IP and MAC addresses. For this embodiment of the cyber security server replica 14, Windows Server 2016 and Windows 10 SHB will be required in addition to the HBSS and ACAS scanning software. Neither Red Hat Enterprise Linux nor CoreSIM will need to be installed on this embodiment of the virtual remote scan testing lab 10.

The ACAS tool (see FIG. 4) used in the preferred embodiment of this disclosure automatically identifies configuration vulnerabilities that could threaten the security of the DoD's computer systems using Nessus and Security Center. This software can be downloaded from Defense Information Systems Agency (DISA), but will require a license key to be provided by the United States Government. The required components for this version of the ACAS are: Nessus User Interface (UI); Passive Vulnerability Scanner; and Security Center.

As shown in FIG. 4, the Host Based Security System (HBSS) can be a collection of flexible conventional off the shelf applications and government off the shelf applications. In one embodiment, the HBSS is comprised of the following components: McAfee Virus Scan Enterprise; McAfee Application Control; McAfee Device Control; Host intrusion prevention system (HIPS); Rogue system detection; McAfee Agent; Asset configuration compliance module; and Policy auditor The VRSTL™ approach in the preferred embodiment of this invention will use only the required components that are appropriate to scanning including: Antivirus; Host-Intrusion Prevent System (HIPS); and McAfee Agent.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Thus, it can be seen that an apparatus and method is described for simulating a physical computer system using virtualization. Virtualization of a system (or systems) can be realized by utilizing common off the shelf (COTS) computer system hardware and virtualization software that simulates each element/entity of an actual computer system. Each entity of the physical computer system can be accurately modeled and simulated to produce similar and/or identical responses to stimuli. A virtualized system including computer hardware, network, and storage resources is used to represent an actual computer system and can be used for testing and observing functions, behavior, and responses that may occur on an actual/physical system. The purpose of the virtualization could include, but is not be limited to, modeling scenarios that may cause harm or damage to an actual physical computer system. Additionally, virtualization would allow tests, experiments, and assessments to be performed when a system is not physically available or accessible. The virtualized computer system responses to one, or multiple forms of stimuli, can be observed, measured, recorded, and documented for use in design, modification and/or testing of the physical computer system. In one instance of the present disclosure, a military weapon systems trainer (WST), composed of various computational hardware and software elements, can be virtualized to allow tests and experiments to be performed to determine the system's response to vulnerability scanning. Many different tests and threat scenarios can be performed to assess common vulnerabilities and exploitations (CVE) that may be present on a physical system which would compromise its security and/or stability.

Also, certain portions of the implementations may have been described as "components" or "circuitry" that perform one or more functions. The term "component" or "circuitry" may include hardware, such as a processor, an application specific integrated circuit (ASIC), or a field programmable gate array (FPGA), or a combination of hardware and software.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

From the above description and examples, it is clear that the inventive concepts disclosed and claimed herein are well adapted to attain the advantages mentioned herein. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A method, comprising:
   virtualizing devices of a first physical computer system to create a virtualized system by scanning the first physical computer system with a second physical computer system, wherein virtualizing includes running a plurality of virtual machines on a hypervisor running on the second physical computer system, the hypervisor being a virtualization layer that is configured to run multiple virtual machines sharing physical resources of the second physical computer system, the plurality of virtual machines representing hardware and software components within the first physical computer system, wherein the hardware and software components of the first physical computer system represented in the plurality of virtual machines is determined by the second physical computer system scanning the first physical computer system using a set of predetermined rules including (i) hardware and software that is present and functioning, (ii) hardware and software that is scannable, present, and functioning, (iii) hardware and software that is present but not functioning, (iv) hardware and software items to be added, and (v) hardware and software that is determined to be present and necessary for the purposes of changes to be evaluated, the virtual machines configured to have ports and services to simulate the first physical computer system;
   changing at least one element of hardware or software in the virtualized computer system of the second physical computer system based on the determination acquired by the set of predetermined rules;
   performing, by the second physical computer system, an assured compliance assessment solution (ACAS) scan on the virtual machines in the virtualized computer system via the ports and services configured to simulate the first physical computer system; and identifying, by the second physical computer system, one or more configuration vulnerability in the at least one element of hardware or software in the virtualized computer system based at least in part on a response of the at least one element of hardware or software in the virtualized computer system to the ACAS scan to determine a potential effect of the change if the change were implemented on the first physical computer system.

2. The method of claim 1, wherein the hardware or software changes that were made in the virtualized computer system are made to the first physical computer system after it has been determined that the hardware or software changes will have no adverse effect on the first physical computer system.

3. The method of claim 1, further comprising the step of connecting the first physical computer to the second physical computer via a cyber security switch.

4. The method of claim 3, wherein the cyber security switch is an external physical network switch configured to allow the second computer system to connected to the first physical computer system.

5. A computer system, comprising:
one or more processors running computer executable code that when executed by the one or more processors cause the one or more processors to:
scan a physical computer system having hardware and software components and determining the hardware and software components of the physical computer system to represent as virtual machines using a set of predetermined rules including (i) hardware or software that is present and functioning, (ii) hardware or software that is scannable, present, and functioning, (iii) hardware or software that is present but not functioning, (iv) hardware or software items to be added, and (v) hardware or software that is determined to be present and necessary for the purposes of the changes to be evaluated;
virtualize the physical computer system with a plurality of virtual machines representing hardware and software components within the physical computer system identified in the scan based on the determination acquired by the set of predetermined rules and configuring the virtual machines to have ports and services to simulate the physical computer system;
run a plurality of the virtual machines on a hypervisor running on the one or more processors, the plurality of virtual machines representing hardware and software components within the physical computer system, the hypervisor being a virtualization layer that is configured to run multiple virtual machines sharing physical resources;
change at least one of the hardware component or the software component in the virtual environment running on the one or more processors;
perform an assured compliance assessment solution (ACAS) scan on the virtual machines in the virtual environment via the ports and services configured to simulate the physical computer system; and
identify one or more configuration vulnerability in the least one of the hardware component or the software component in the virtual environment based at least in part on a response of the at least one of the hardware component or the software component in the virtual environment to the ACAS scan to determine a potential effect of the change if the change were implemented on the physical computer system.

6. The computer system of claim 5, wherein the at least one hardware component or software component that were changed in the virtualized computer system are changed in the physical computer system after it has been determined that the at least one hardware component or software component changed will have no adverse effect on the physical computer system.

\* \* \* \* \*